(12) United States Patent
Daiku (10) Patent No.: US 8,139,179 B2
(45) Date of Patent: Mar. 20, 2012

(54) DISPLAY APPARATUS CAPABLE OF CONTROLLING RANGE OF VISUALLY RECOGNIZABLE OBSERVATION ANGLE

(75) Inventor: Yasuhiro Daiku, Iruma (JP)

(73) Assignee: Casio Computer Co., Ltd., Tokyo (JP)

( * ) Notice: Subject to any disclaimer, the term of this patent is extended or adjusted under 35 U.S.C. 154(b) by 1398 days.

(21) Appl. No.: 11/709,506

(22) Filed: Feb. 22, 2007

(65) Prior Publication Data

US 2007/0200974 A1   Aug. 30, 2007

(30) Foreign Application Priority Data

Feb. 28, 2006 (JP) .................. 2006-053450

(51) Int. Cl.
*G02F 1/1335* (2006.01)
(52) U.S. Cl. ............... 349/63; 349/64; 349/65
(58) Field of Classification Search ............ 349/61–65
See application file for complete search history.

(56) References Cited

U.S. PATENT DOCUMENTS

| | | | | |
|---|---|---|---|---|
| 6,048,071 A * | 4/2000 | Sawayama | ............ | 362/603 |
| 6,577,359 B2 * | 6/2003 | Ishihara | ............ | 349/63 |
| 7,391,485 B2 | 6/2008 | Kim et al. | | |
| 7,397,521 B2 * | 7/2008 | Yuuki et al. | ............ | 349/63 |
| 2003/0058381 A1 | 3/2003 | Shinohara et al. | | |

FOREIGN PATENT DOCUMENTS

| | | |
|---|---|---|
| JP | 2001-183662 A | 7/2001 |
| JP | 2003-150073 A | 5/2003 |
| JP | 2004-133334 A | 4/2004 |
| JP | 2004-287436 A | 10/2004 |
| JP | 2005-258023 A | 9/2005 |

OTHER PUBLICATIONS

Japanese Office Action dated Mar. 2, 2010 and English translation thereof in counterpart Japanese Application No. 2006-053450.
Japanese Office Action dated Nov. 17, 2009 and English translation thereof issued in a counterpart Japanese Application No. 2006-053450.

* cited by examiner

*Primary Examiner* — Dung T. Nguyen
(74) *Attorney, Agent, or Firm* — Holtz, Holtz, Goodman & Chick, PC (57) ABSTRACT

A display apparatus includes a display panel that displays an image, and a viewing angle restricting element that selectively irradiates light with directivity in a restricting direction at a predetermined angle with respect to a direction of normal to the display panel, toward an observation side of the display panel.

18 Claims, 4 Drawing Sheets

DISPLAY APPARATUS CAPABLE OF CONTROLLING RANGE OF VISUALLY RECOGNIZABLE OBSERVATION ANGLE

CROSS-REFERENCE TO RELATED APPLICATIONS

This application is based upon and claims the benefit of priority from prior Japanese Patent Application No. 2006-053450, filed Feb. 28, 2006, the entire contents of which are incorporated herein by reference.

BACKGROUND OF THE INVENTION

1. Field of the Invention

The present invention relates to a display apparatus capable of wide viewing angle display and narrow viewing angle display.

2. Description of the Related Art

A display apparatus to be mounted in an electronic appliance such as a cell phone must be able to switch the range of the visually recognizable visual angle, i.e. viewing angle, of its display between wide range of visual angle and narrow range of visual angle that prevents the display content from being peeked out by anyone other than the user of the display apparatus.

Jpn. Pat. Appln. KOKAI Publication No. 2004-133334 discloses a liquid crystal display apparatus capable of changing the range of viewing angle. The liquid crystal display apparatus includes a viewing angle restricting element, arranged on one surface of a liquid crystal display element, to decrease the visibility from a direction inclined with respect to the front direction of the liquid crystal display element. The liquid crystal display apparatus is thus capable of wide viewing angle display and narrow viewing angle display with a high security that is free from being peeked out by a third party.

The viewing angle restricting element of the liquid crystal display apparatus is provided with segment regions on each of the opposing inner surfaces of a pair of substrates. Electrodes having predetermined shapes are formed to correspond to the respective segment regions. A liquid crystal layer is sealed between the pair of substrates. The liquid crystal molecules of the liquid crystal layer are aligned, in each segment region, in an alignment state having a viewing angle in a direction inclined in one direction with respect to the direction of normal to the liquid crystal element, and an alignment state having a viewing angle in a direction inclined in a direction opposite to the above inclined direction.

With this liquid crystal display apparatus, when no voltage is applied between the electrodes of the viewing angle restricting element, that is, when the viewing angle restricting element is in a non-display state, the display image of the liquid crystal display element can be seen with a wide viewing angle. In contrast to this, when a voltage is applied between the electrodes of the viewing angle restricting element, a display content corresponding to the electrodes with the predetermined shapes of the segment regions emerges, having a viewing angle in the direction inclined with respect to one direction of the viewing angle restricting element and a viewing angle in a direction inclined in the opposite direction appears. When seeing the liquid crystal display apparatus from directions inclined in one direction and the opposite other direction with respect to the front direction, the display content corresponding to the electrodes conceals the display image of the liquid crystal display element. Then, the display image of the liquid crystal display element cannot be recognized from directions inclined toward the one and the other directions. This restricts the apparent viewing angle of the display image to narrow the viewing angle of the display image.

A display panel is overlaid on a viewing angle restricting liquid crystal element having almost the same structure as that of the display panel. This decreases the transmittance of the display element to darken the display content. As the viewing angle restricting liquid crystal element has almost the same structure as that of the display panel, its structure becomes complicated.

BRIEF SUMMARY OF THE INVENTION

A display apparatus according to one aspect of the present invention includes (i) a display panel that displays an image, (ii) a viewing angle restricting element that selectively irradiates light with directivity in a restricting direction at a predetermined angle with respect to a direction normal to the display panel, toward an observation side of the display panel, and (iii) a surface illuminant that is arranged on a side opposite to the observation side of the display panel and irradiates the display panel with illumination light.

A display apparatus according to another aspect of the present invention includes (i) a liquid crystal display panel that includes a screen region where pixels that control transmission of light are arranged in a matrix, and displays an image, (ii) a viewing angle restricting element that selectively irradiates light with directivity in a restricting direction at a predetermined angle with respect to a direction normal to the display panel, toward an observation side of the display panel; and (iii) a surface illuminant that is arranged on a side opposite to the observation side of the liquid crystal display panel and radiates illumination light spreading in an angular range that includes an exit direction of the light with directivity irradiated from the viewing angle restricting element and is wider than a range of a spread angle of the light irradiated from the viewing angle restricting element, toward the liquid crystal display panel.

A display apparatus according to a further aspect of the present invention includes (i) a display panel that displays an image within a predetermined viewing angle range in which an image is visually recognizable, (ii) a viewing angle restricting element that is arranged on an observation side of the display panel, transmits image light irradiated from the display panel, and selectively irradiates, toward the observation side, restricting light with directivity having a light intensity peak in a restricting direction that is within the viewing angle range and inclined at a predetermined angle with respect to a direction normal to the display panel, and (iii) a surface illuminant that is arranged on a side opposite to the observation side of the display panel and irradiates the display panel with illumination light that spreads in the viewing angle range.

And a display apparatus according to a still further aspect of the present invention includes (i) a liquid crystal display panel that includes a screen region where pixels that control transmission of light are arranged in a matrix, and displays an image formed of the pixels within a visually recognizable predetermined viewing angle range, (ii) a viewing angle restricting element that comprises a light guide member and a light source unit, the light guide member being arranged on an observation side of the liquid crystal display panel and including a transparent plate including two opposing plate surfaces and end faces intersecting the plate surfaces, wherein the viewing angle restricting element transmits image light irradiated from the liquid crystal display panel, and wherein the viewing angle restricting element irradiates light entering the transparent plate through at least one incident end face thereof, through one of the two plate surfaces of the transparent plate in two directions that are within the viewing angle range and are inclined toward one side of the liquid crystal display panel and another side opposite thereto at predetermined angles with respect to a direction normal to the plate surface, and wherein the light source unit is arranged at the incident end face of the light guide member and causes the light to enter the light guide member through the incident end face, and (iii) a surface illuminant that is arranged on a side opposite to the observation side of the liquid crystal display panel and irradiates the liquid crystal display panel with illumination light that spreads within the viewing angle range.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
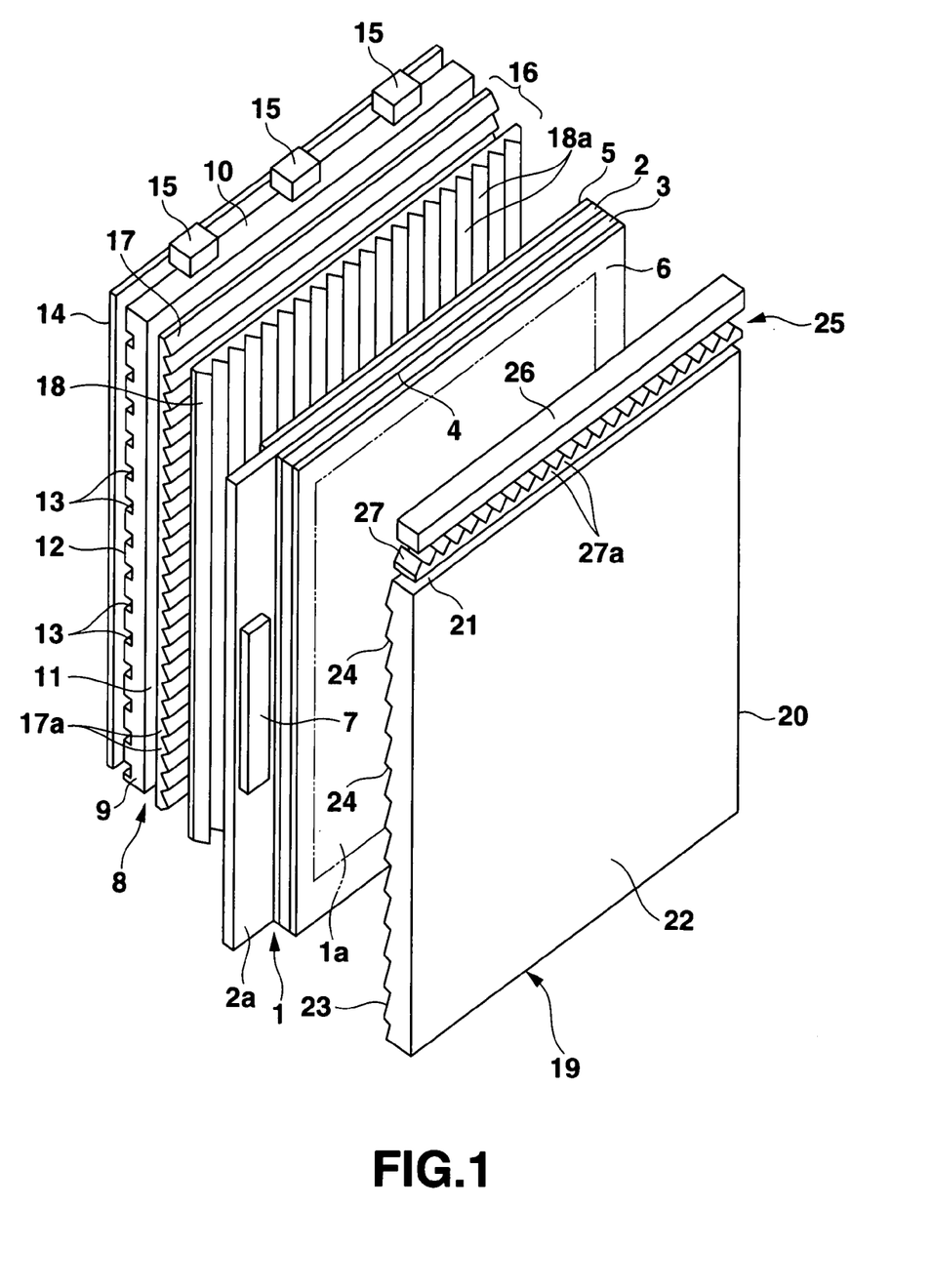
FIG. 1 is a perspective view of a display apparatus according to an embodiment of the present invention.
Figure 2A:
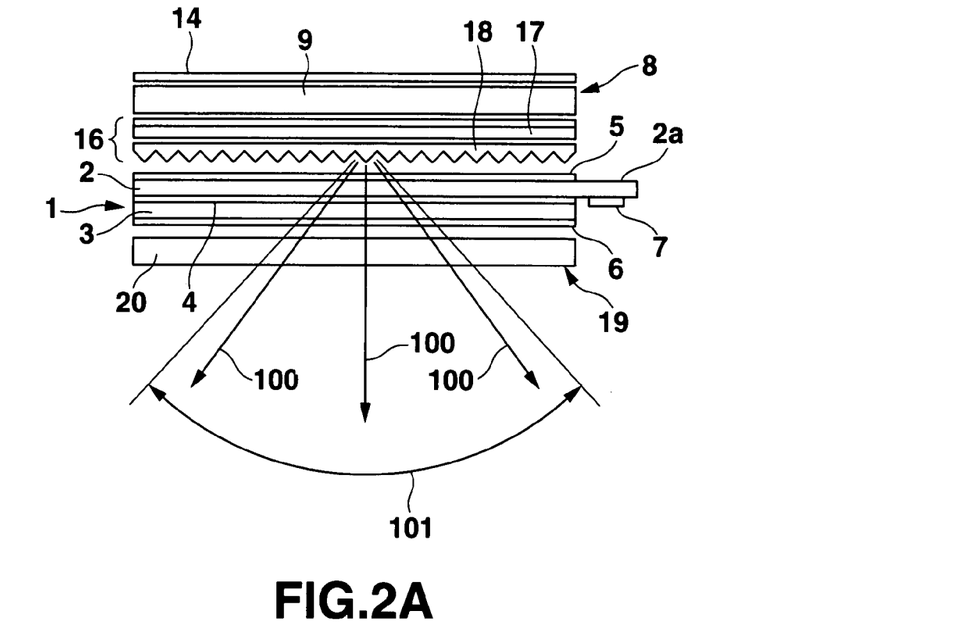
FIG. 2A shows exit light from the display apparatus when wide viewing angle display is selected.
Figure 2B:
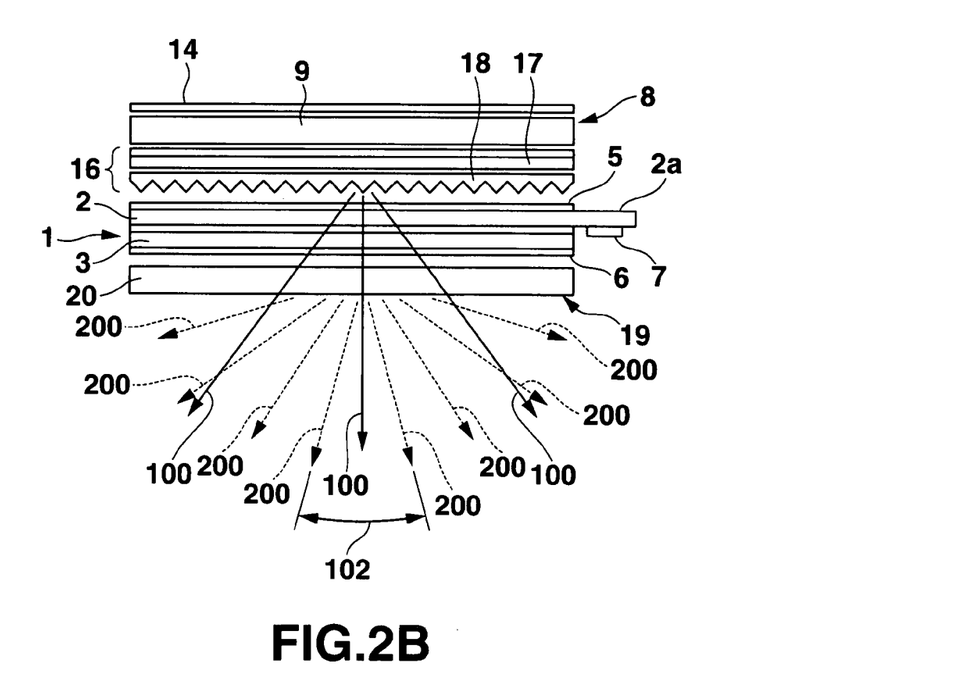
FIG. 2B shows exit light from the display apparatus when narrow viewing angle display is selected.

FIG. 1 is a perspective view of a display apparatus according to an embodiment of the present invention, FIG. 2A shows exit light when wide viewing angle display is selected, and FIG. 2B shows exit light when narrow viewing angle display is selected.

The display apparatus according to this embodiment includes, as a display panel that displays an image, a liquid crystal display panel 1 having an image region 1a where pixels, which control light transmission, are arranged in a matrix. As shown in FIGS. 1, 2A, and 2B, the display apparatus has the liquid crystal display panel 1, which displays the image within a predetermined range of viewing angle where the image is visually recognizable, a surface illuminant 8 arranged on a side opposite to the observation side of the liquid crystal display panel 1, and a viewing angle restricting element 19 arranged on the observation side of the liquid crystal display panel 1.

Although its internal structure is not shown, the liquid crystal display panel 1 has a pair of transparent substrates 2 and 3 bonded to each other through a frame-like seal member 4 surrounding the image region 1a, transparent electrodes formed on each of the opposing inner surfaces of the substrates 2 and 3, the opposing regions of the transparent electrodes forming pixels arranged in a matrix, a liquid crystal layer sealed between the pair of substrates 2 and 3 in the region surrounded by the seal member 4, and a pair of polarization plates 5 and 6 arranged on the outer surfaces of the pair of substrates 2 and 3, respectively.

The liquid crystal display panel 1 comprises an active matrix liquid crystal display panel provided with pixel electrodes arranged in matrix on the inner surface of one substrate 2 in the direction of row and the direction of column, and a single film-like counterelectrode arranged on the inner surface of the other substrate 3 to oppose the region where the pixel electrodes are arranged. The inner surface of the substrate 2 of the active matrix liquid crystal display panel is provided with active elements comprising TFTs respectively connected to the pixel electrodes, gate wiring lines respectively connected to the TFTs of each row, and data wiring lines respectively connected to the TFTs of each column.

The substrate 2 has a driver mounting portion 2a protruding outside the other substrate 3. The gate wiring lines and data wiring lines extend to the driver mounting portion 2a. A display driver 7 comprising an LSI connected to the gate wiring lines and data wiring lines is placed on the driver mounting portion 2a.

The inner surfaces of the pair of substrates 2 and 3 are provided with alignment films to cover the electrodes. The liquid crystal molecules of the liquid crystal layer are aligned between the pair of substrates 2 and 3 in a state defined by the alignment films.

The liquid crystal display panel 1 comprises either a TN liquid crystal display panel including liquid crystal molecules aligned in twist, a perpendicular alignment type liquid crystal display panel including liquid crystal molecules aligned almost perpendicularly with respect to the surfaces of substrates 2 and 3, a horizontal alignment type liquid crystal display panel including liquid crystal molecules aligned almost parallel to the surfaces of substrates 2 and 3 without twisting, or a bend alignment type liquid crystal display panel including liquid crystal molecules aligned with bend, or a ferroelectric or anti-ferroelectric liquid crystal display panel. The pair of polarization plates 5 and 6 are arranged by setting the directions of their transmission axes to obtain high contrast characteristics.

The liquid crystal display panel 1 is not limited to be of a longitudinal electric field control type, in which a longitudinal electric field (an electric field in the direction of thickness of the liquid crystal layer) is generated between electrodes formed on the inner surfaces of a pair of substrates 2 and 3 to change the alignment state of liquid crystal molecules, but may be of a lateral electric field control type, in which, for example, the inner surface of either one of a pair of substrates 2 and 3 is provided with first and second comb-like electrodes that form pixels, and a lateral electric field (an electric field in a direction along the substrate surface) is generated between the first and second electrodes to change the alignment state of liquid crystal molecules.

The liquid crystal display panel 1 may comprise a normally white mode display element or a normally black mode display element.

Figure 3:
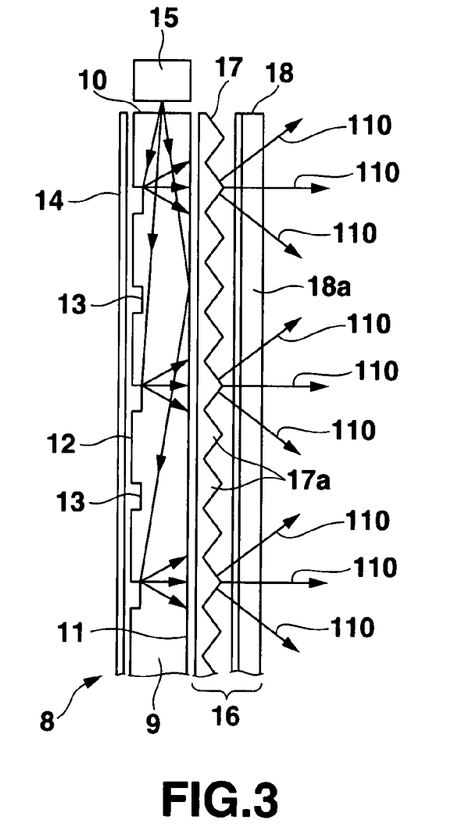
FIG. 3 is an enlarged side view of part of a surface illuminant in the display apparatus.

FIG. 3 is an enlarged side view of part of the surface illuminant 8 arranged on a side opposite to the observation side of the liquid crystal display panel 1. The surface illuminant 8 comprises a light guide plate 9 formed of a transparent acrylic resin plate or the like, light-emitting elements 15 to emit light incident on the light guide plate 9, and an optical element 16 to adjust the spread angle of the light irradiated from the light guide plate 9. The light guide plate 9 has an incident end face 10 formed on one of its two opposing end faces to cause light to enter the incident end face 10, an exit surface 11 formed on one of its two plate surfaces to irradiate the light entering the incident end face 10 from the exit surface 11, and a reflection surface 12 formed on the other one of its two plate surfaces to reflect the light entering the incident end face 10 toward the exit surface 11. The light-emitting elements 15 are arranged to oppose the incident end face 10 of the light guide plate 9 and generate light toward the incident end face 10. The optical element 16 is arranged on the exit surface side of the light guide plate 9 to oppose the exit surface.

The exit surface 11 of the light guide plate 9 forms a flat surface. The reflection surface 12 of the light guide plate 9 has diffusing/reflecting portions 13 at pitches equal to or smaller than the pixel pitches of the liquid crystal display panel 1 at gaps in the traveling direction of the light entering the incident end face 10. The diffusing/reflecting portions 13 diffuse and reflect the light entering the incident end face 10 toward the exit surface 11.

The diffusing/reflecting portions 13 comprise thin grooves, which extend in the entire length of the plate width of the light guide plate 9 in a direction parallel to the direction of length of the incident end face 10 of the light guide plate 9 and have rectangular sectional shapes. Portions among the diffusing/reflecting portions 13 of the reflection surface 12 form flat surfaces almost parallel to the exit surface 11.

The reflection surface 12 of the light guide plate 9 and its diffusing/reflecting portions 13 comprise inner reflection surfaces that totally reflect the light entering the incident end face 10 by the interfaces with respect to the external air. A reflection plate 14 to cause light leaking from the reflection surface 12 and diffusing/reflecting portions 13 to enter the light guide plate 9 again is arranged outside the reflection surface 12.

The light guide plate 9 is arranged so that its incident end face 10 corresponds to one side edge of the liquid crystal display panel 1, e.g., one edge (the upper edge of the screen in the drawing) in the vertical direction of the screen, and that the exit surface 11 opposes the liquid crystal display panel 1.

The light-emitting elements 15 comprise solid-state light-emitting elements such as LEDs (light-emitting diodes). The light-emitting elements 15 are arranged at gaps in the direction of length of the incident end face 10 to oppose the incident end face 10 of the light guide plate 9.

The optical element 16 arranged on the exit surface side of the light guide plate 9 comprises first and second prism sheets 17 and 18 provided with thin elongated prism portions 17a and 18a having isosceles triangular sections, respectively, each on one surface of a corresponding transparent resin film. The thin elongated prism portions 17a and 18a of the prism sheets 17 and 18 are formed at pitches smaller than those of the diffusing/reflecting portions 13 of the reflection surface 12 of the light guide plate 9.

The first prism sheet 17 is arranged on the exit side of the light guide plate 9 so that one of its surface where the thin elongated prism portions 17a are formed and a flat surface opposite to it opposes the exit surface 11 of the light guide plate 9. The directions of length of the thin elongated prism portions 17a of the first prism sheet 17 are aligned parallel to one of a direction parallel to the incident end face 10 of the light guide plate 9 and a direction perpendicular to it. For example, the first prism sheet 17 is arranged such that the directions of length of the thin elongated prism portions 17a are almost parallel to the horizontal direction of the screen of the liquid crystal display panel 1. The second prism sheet 18 is arranged on the other surface side of the first prism sheet 17 so that one of its surface where the thin elongated prism portions 18a are formed and a flat surface opposite to it opposes the other surface of the first prism sheet 17. The directions of length of the thin elongated prism portions 18a of the second prism sheet 18 are aligned parallel to the remaining one of the direction parallel to the incident end face 10 of the light guide plate 9 and the direction parallel to it. For example, the second prism sheet 18 is arranged on the exit side (a side opposite to the side that opposes the light guide plate 9) of the first prism sheet 17 such that its flat surface opposes the exit surface of the first prism sheet 17 and that the directions of length of the thin elongated prism portions 18a are almost parallel to the vertical direction of the screen of the liquid crystal display panel 1.

By driving to turn on the light-emitting elements 15, the surface illuminant 8 irradiates illumination light 110 having a spread angle with a predetermined wide range with respect to the direction of normal to the liquid crystal display panel 1 toward the liquid crystal display panel 1.

More specifically, as indicated by arrow lines in FIG. 3, the light from the light-emitting elements 15 enters the light guide plate 9 through its incident end face 10. The exit surface 11 of the light guide plate 9 and the flat surfaces between the diffusing/reflecting portions 13 of the reflection surface 12 cause the light to repeat internal reflection to travel within the light guide plate 9. During this reflection, the light from the light-emitting elements 15 is diffused and reflected by the diffusing/reflecting portions 13 of the reflection surface 12, so as to be irradiated from the exit surface 11 with a large spread angle.

The diffusion light irradiated from the exit surface 11 of the light guide plate 9 is irradiated from the first prism sheet 17 toward the liquid crystal display panel 1 with light diffused in directions perpendicular to the directions of length of the thin elongated prism portions 17a, i.e., in the vertical direction of the screen of the liquid crystal display panel 1 being converged by the thin elongated prism portions 17a of the first prism sheet 17. Similarly, The diffusion light irradiated from the exit surface 11 of the light guide plate 9 is irradiated from the second prism sheet 18 toward the liquid crystal display panel 1 with light diffused in directions perpendicular to the directions of lengths of the thin elongated prism portions 18a, i.e., in the horizontal direction of the screen of the liquid crystal display panel 1 being converged by the thin elongated prism portions 18a of the second prism sheet 18.

Thus, the illumination light 110 irradiated from the surface illuminant 8 toward the liquid crystal display panel 1 comprises light having a comparatively wide spread angle about the direction of normal to the liquid crystal display panel 1 as the center.

Figure 4:
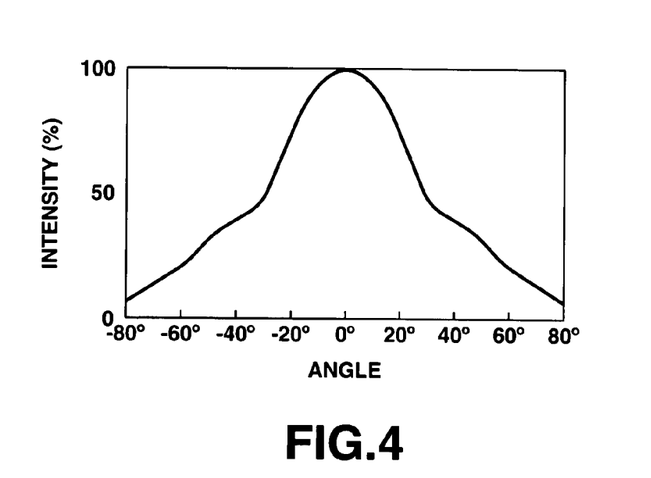
FIG. 4 is a graph showing the intensity distribution of illumination light from the surface illuminant.

FIG. 4 is a graph showing the intensity distribution in the horizontal direction (the horizontal direction of the screen of the liquid crystal display panel 1) of the illumination light 110 from the surface illuminant 8. In FIG. 4, a negative angle indicates a tilt angle inclined to the left with respect to the direction of normal (the direction of 0°) to the liquid crystal display panel 1. A positive angle indicates a tilt angle inclined to the right with respect to the direction of normal.

The surface illuminant 8 irradiates diffusion light with a large spread angle from the exit surface 11 of the light guide plate 9. The optical element 16 comprising the first prism sheets 17 and 18 converges the diffusion light to irradiate the converged light toward the liquid crystal display panel 1.

Thus, the intensity distribution of the illumination light 110 in a direction parallel to the vertical direction of the screen of the liquid crystal display panel 1 is almost the same as that in FIG. 4.

In this display apparatus, the surface illuminant 8 to irradiate the illumination light 110 that has the large spread angle about the direction of normal to the liquid crystal display panel 1 as the center and spreads in an angular range including the range of viewing angle of the liquid crystal display panel 1 is arranged on the side opposite to the observation side of the liquid crystal display panel 1. Thus, the liquid crystal display panel 1 displays an image that has a wide viewing angle and sufficiently high luminance and contrast when seen from the direction of normal to the liquid crystal display panel 1.

The display apparatus may be a color image display apparatus in which the inner surface of either one of a pair of substrates 2 and 3 of a liquid crystal display panel 1 is provided with red, green, and blue color filters respectively corresponding to pixels, or a field sequential display apparatus in which a liquid crystal display panel 1 displays a color image without being provided with any color filters. In the case of the field sequential display apparatus, the light-emitting elements 15 of the surface illuminant 8 comprises solid-state light-emitting elements having red LEDs, green LEDs, and blue LEDs, and selectively emits red, green, and blue light.

The surface illuminant 8 of this embodiment comprises the light guide plate 9 having the incident end face 10 on its one end face. Alternatively, incident end faces 10 may be formed on both two opposing end faces of the light guide plate 9, and light-emitting elements 15 may be arranged to oppose the incident end faces 10.

Figure 5A:
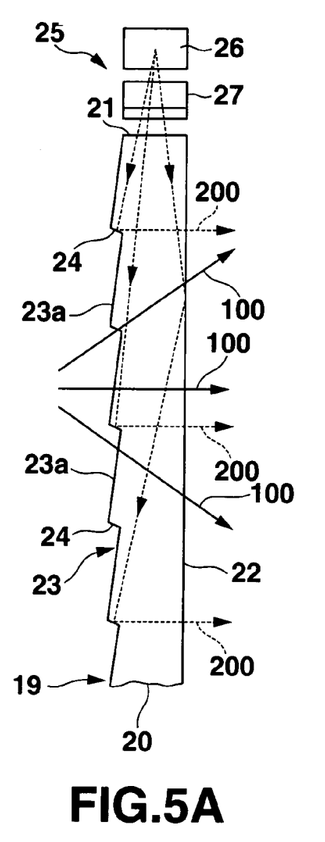
FIG. 5A is an enlarged side view of part of a viewing angle restricting element in the display apparatus.
Figure 5B:
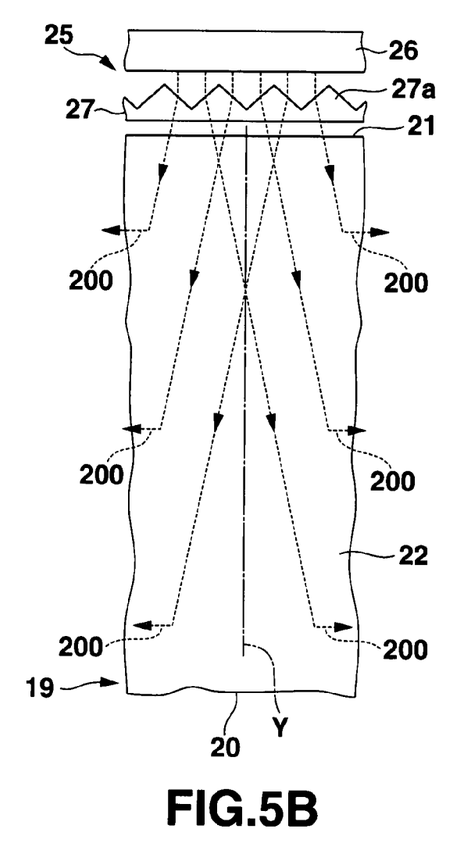
FIG. 5B is an enlarged front view of part of the viewing angle restricting element in the display apparatus.

FIGS. 5A and 5B are an enlarged side view and an enlarged front view, respectively, of part of a viewing angle restricting element 19 arranged on the observation side of the liquid crystal display panel 1.

As shown in FIGS. 5A and 5B, the viewing angle restricting element 19 comprises a light irradiating device that irradiates light 200 with directivity having light intensity peaks in two oblique directions inclined in one direction and the other direction opposite to it at predetermined angles with respect to the direction of normal to the liquid crystal display panel 1. The light irradiating device comprises a light guide member 20 formed of a transparent plate having two opposing plate surfaces, two opposing end faces intersecting the two plate surfaces, and two other opposing side end faces intersecting the two plate surfaces and two end faces, and a light source unit 25 to irradiate light toward the light guide member 20. The light guide member 20 has an incident end face 21, formed on at least one of the two end faces, for receiving light. The light guide member 20 also has an exit surface 22, formed on one of the two plate surfaces of the light guide member 20, for irradiating light. The light guide member 20 further has a reflection surface 23, formed on the other plate surface of the light guide member 20, for internally reflecting light entering through the incident end face 21 in directions inclined toward one side end face and the other side end face with respect to the normal to the incident end face 21, toward the exit surface 22, in directions inclined in one and the other directions with respect to a plane including the normal to the incident end face 21 and a normal to the exit surface 22. The light guide member 20 is arranged with the reflection surface 23 opposing the observation-side surface of the liquid crystal display panel 1. The light source unit 25 is arranged to oppose the incident end face 21 of the light guide member 20, and irradiates light in a direction inclined toward one side end face of the light guide member 20 and light in a direction inclined toward the other side end face, with respect to the direction of normal to the incident end face 21 of the light guide member 20 toward the incident end face 21 of the light guide member 20.

The exit surface 22 of the light guide member 20 is formed in a flat surface. The reflection surface 23 of the light guide member 20 has reflecting portions 24 at gaps in the traveling direction of the light entering from the incident end face 21, with pitches almost the same as the pixel pitches of the liquid crystal display panel 1, or pitches smaller than that. The reflecting portions 24 reflect the light entering from the incident end face 21 toward the exit surface 22.

For example, the reflecting portions 24 comprise narrow inclined surfaces, which are formed to extend through the entire length of the plate width of the light guide member 20 along a direction parallel to the direction of length of the incident end face 21 of the light guide member 20, to be inclined in a direction opposite to the incident end face 21 side with respect to the normal to the exit surface 22. The tilt angle of the reflecting portions 24 with respect to the normal is set so that when light in a direction parallel to a plane including the normal to the incident end face 21 enters the incident end face 21, the reflecting portions 24 internally reflect the light in a direction almost parallel to the normal to the exit surface 22.

Inclined surfaces 23a are formed between the respective reflecting portions 24 of the reflection surface 23. Each inclined surface 23a extends through the upper edge of the corresponding reflecting portion 24, which is on the exit surface 22 side, and the lower edge of the adjacent reflecting portion 24, which is on a side opposite to the exit surface 22.

The light guide member 20 is arranged on the observation side of the liquid crystal display panel 1 so that the incident end face 21 corresponds to one side edge of the liquid crystal display panel 1, i.e., one edge (upper edge of the screen in the drawing) in the vertical direction of the screen, and that the reflection surface 23 opposes the observation-side surface of the liquid crystal display panel 1.

The light source unit 25 arranged to oppose the incident end face 21 of the light guide member 20 irradiates, toward the incident end face 21 of the light guide member 20, light in directions inclined toward one side end face and the other side end face of the light guide member 20 with respect to a normal Y to the incident end face 21.

The light source unit 25 includes a light-emitting member 26 arranged to oppose the incident end face 21 of the light guide member 20, and a prism array 27 arranged between the incident end face 21 and light-emitting member 26. The light-emitting member 26 emits light toward the incident end face 21 of the light guide member 20. The prism array 27 refracts the light from the light-emitting member 26 in directions inclined toward one side end face and the other side end face of the light guide member 20 with respect to the normal Y to the incident end face 21 of the light guide member 20, causing it to enter the light guide member 20 through the incident end face 21.

The light-emitting member 26 comprises a light-emitting element array formed of solid-state light-emitting elements (e.g., LEDs) arrayed linearly, and is arranged parallel to the direction of length of the incident end face 21 to oppose the incident end face 21 of the light guide member 20.

The prism array 27 is obtained by arraying prism portions 27a, on one surface of an elongated transparent resin film corresponding to the incident end face 21 of the light guide member 20, in the direction of length of the resin film at predetermined pitches, e.g., pitches equal to or smaller than the pixel pitches of the liquid crystal display panel 1. The prism portions 27a have isosceles triangular sections along a direction perpendicular to the direction of length of the resin film.

The prism array 27 is arranged between the incident end face 21 of the light guide member 20 and the light-emitting member 26 so that its surface formed with the prism portions 27a, or its flat surface on the opposite side, opposes the light-emitting member 26.

The viewing angle restricting element 19 transmits image light 100 (light emitted from the surface illuminant 8 and transmitted through the pixels of the liquid crystal display panel 1) irradiated from the liquid crystal display panel 1, and selectively irradiates light 200 (to be referred to as restricting light hereinafter) with directivity in a direction inclined with respect to the direction of normal to the liquid crystal display panel 1 toward the observation side.

The display apparatus is to be mounted on the display portion of an electronic appliance such as a cell phone. The viewing angle restricting element 19 drives to turn on the light-emitting member 26, when narrow viewing angle is selected in response to selection between wide viewing angle and narrow viewing angle by, e.g., a field selection key provided to the electronic appliance, irradiating the restricting light 200 toward the observation side.

More specifically, the viewing angle restricting element 19 includes the light guide member 20 formed of the transparent plate having the two opposing plate surfaces, the two opposing end faces intersecting the two plate surfaces, and the two other opposing side end faces intersecting the two plate surfaces and end faces. The light guide member 20 is arranged on the Observation side of the liquid crystal display panel 1 so that the reflection surface 23 opposes the observation-side surface of the liquid crystal display panel 1. Hence, as shown in FIG. 5A, the image light 100 irradiated from the liquid crystal display panel 1 is transmitted through the light guide member 20 to be irradiated to the observation side.

Furthermore, the light source unit 25 including the light-emitting member 26 and prism array 27 is arranged to oppose the incident end face 21 of the light guide member 20. Hence, as indicated by broken arrow lines in FIG. 5B, the prism portions 27a of the prism array 27 refract the light from the light-emitting member 26 in the directions inclined toward one side end face and the other side end face of the light guide member 20 with respect to the normal Y to the incident end face 21 of the light guide member 20, causing it to enter the light guide member 20 through the incident end face 21.

The light entering the light guide member 20 from the incident end face 21 is internally reflected by the exit surface 22 of the light guide member 20 and the inclined surfaces of the reflection surface 23 to propagate in the light guide member 20. During this propagation, the light propagating in the light guide member 20 is internally reflected by the reflecting portions 24 of the reflection surface 23 in directions inclined toward one side end face and the other side end face of the light guide member 20 with respect to the normal to the exit surface 22 toward the exit surface 22, at angles,corresponding to the incident angles from the incident end face 21 with respect to the normal Y.

Hence, light entering the light guide member 20 through the incident end face 21 in a direction inclined toward one side end face of the light guide member 20 with respect to the normal Y of the incident end face 21 is irradiated from the exit surface 22 of the light guide member 20 to the observation side in a restricting direction inclined toward one side end face of the light guide member 20 with respect to the direction of normal (normal to the exit surface 22) of the liquid crystal display panel 1. Also, light entering through the incident end face 21 in a direction inclined toward the other side end face of the light guide member 20 with respect to the normal Y to the incident end face 21 is irradiated from the exit surface 22 of the light guide member 20 to the observation side in a restricting direction inclined toward the other side end face of the light guide member 20 with respect to the direction of normal to the liquid crystal display panel 1.

According to this embodiment, the light guide member 20 of the viewing angle restricting element 19 is arranged so that its incident end face 21 corresponds to one edge in the vertical direction of the screen of the liquid crystal display panel 1. Hence, the light guide member 20 irradiates, from the exit surface 22, the restricting light 200 with directivity in a direction inclined toward the left of the screen with respect to the direction of normal to the liquid crystal display panel 1 and the restricting light 200 with directivity in a direction inclined toward the right of the screen.

More specifically, the display panel has a range of viewing angle where the display image is visually recognizable, within an angular range that includes the exit direction of light with directivity irradiated from the viewing angle restricting element and is wider than the range of spread angle of the light irradiated from the viewing angle restricting element. The viewing angle restricting element 19 irradiates the restricting light 200 with directivity in directions inclined to the right and left with respect to the direction of normal to the liquid crystal display panel 1, to decrease the contrast of the display image observed from the restricting direction. This allows wide viewing angle display and narrow viewing angle display.

Figure 6:
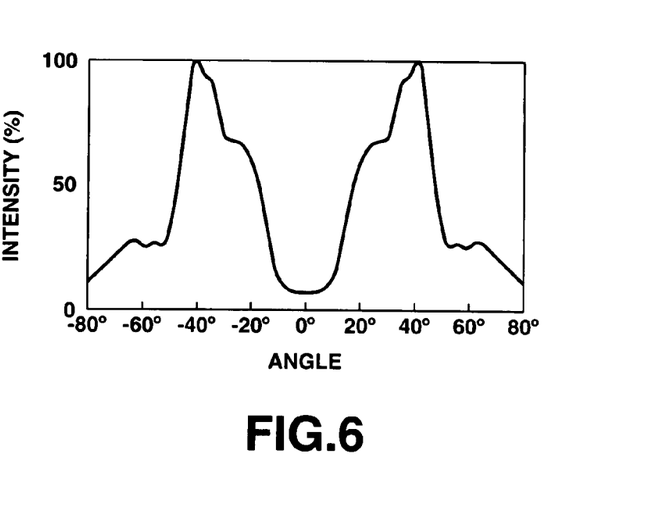
FIG. 6 is a graph showing the intensity distribution of restricting light from the viewing angle restricting element.

FIG. 6 shows the intensity distribution in the horizontal direction (the right-and-direction of the screen of the liquid crystal display panel 1) of the restricting light 200 irradiated from the viewing angle restricting element 19. In FIG. 6, a negative angle indicates a tilt angle inclined to the left with respect to the direction of normal (the direction of 0°) to the liquid crystal display panel 1. A positive angle indicates a tilt angle inclined to the right with respect to the direction of normal.

As in this intensity distribution graph, the viewing angle restricting element 19 irradiates the restricting light 200 with directivity having light intensity peaks in directions (restricting directions) inclined at predetermined angles with respect to the direction of normal to the liquid crystal display panel 1 in one direction (to the left of the screen) and a direction opposite to it (to the right of the screen).

More specifically, the viewing angle restricting element 19 irradiates the restricting light 200 within a restricting angular range that is in the range of viewing angle of the liquid crystal display panel, includes the predetermined restricting direction, and has a spread angle narrower than the range of viewing angle.

The viewing angle restricting element 19 of this embodiment comprises the light guide member 20 having the incident end face 21 on its one end face. Alternatively, incident end faces 21 may be formed on both of the two opposing end faces of the light guide member 20, and light source units 25 may be arranged to respectively oppose the incident end faces 21. In this case, the reflection surface 23 of the light guide member 20 is formed into a shape having reflecting portions that internally reflect light entering from one incident end face toward the exit surface 22 and reflecting portions that internally reflect light entering from the other incident end face toward the exit surface 22.

This display apparatus includes the viewing angle restricting element 19 that is arranged on the observation side of the liquid crystal display panel 1, transmits the image light 100 irradiated from the liquid crystal display panel 1, and selectively irradiates light with directivity in a direction inclined with respect to the direction of normal to the liquid crystal display panel 1 to the observation side. Thus, the display apparatus performs wide viewing angle display and narrow viewing angle display by controlling exit of the restricting light 200 from the viewing angle restricting element 19.

More specifically, this display apparatus controls irradiateion of the restricting light 200 from the viewing angle restricting element 19 arranged on the observation side of the liquid crystal display panel 1, to perform wide viewing angle display and narrow viewing angle display. When the viewing angle restricting element 19 is not to irradiate the restricting light 200, as shown in FIG. 2A, only the image light 100 irradiated from the liquid crystal display panel 1 is transmitted through the viewing angle restricting element 19 to be irradiated to the observation side. Thus, the display image on the liquid crystal display panel 1 is seen within the wide range of viewing angle 101 corresponding to the spread angle of the illumination light 110 from the surface illuminant 8.

In contrast to this, as shown in FIG. 2B, assume that the viewing angle restricting element 19 is to irradiate, toward the observation side, the restricting light 200 with directivity in directions inclined with respect to the direction of normal to the liquid crystal display panel 1 within a restricting angular range that is in the range of viewing angle of the liquid crystal display panel 1, includes a predetermined restricting direction, and is narrower than the range of viewing angle. In this case, the restricting light 200 with a high light intensity is irradiated in the restricting direction inclined with respect to the direction of normal to the liquid crystal display panel 1. Accordingly, the contrast of the display image observed from the restricting direction decreases largely, so the display image is not recognized. Then, the range of viewing angle of the display image corresponds to a narrow angular range 102 including the normal to the liquid crystal display panel 1.

The restricting light 200 to merge from the viewing angle restricting element 19 may comprise white light or any arbitrary color light. By irradiating white restricting light 200 from the viewing angle restricting element 19, the entire screen becomes white when seen from a direction inclined with respect to the direction of normal to the liquid crystal display panel 1, thus performing narrow viewing angle display. Alternatively, by irradiating, e.g., blue restricting light 200 from the viewing angle restricting element 19, the entire screen becomes blue when seen from the direction inclined with respect to the direction of normal to the liquid crystal display panel 1, thus performing narrow viewing angle display.

In addition, the viewing angle restricting element 19 serves to transmit the image light 100 irradiated from the liquid crystal display panel 1, and selectively irradiate the restricting light 200 with directivity in a direction inclined with respect to the direction of normal to the liquid crystal display panel 1, to the observation side. Thus, when compared to the conventional display apparatus that restricts the range of viewing angle by blocking light irradiated in an oblique direction, display within the range of viewing angle in the vicinity of the front surface of the display apparatus is kept bright, and the structure of the viewing angle restricting element becomes simple.

As described above, the display apparatus according to the present invention comprises a display panel that displays an image, and a viewing angle restricting element that selectively irradiates light with directivity in a restricting direction at a predetermined angle with respect to a direction of normal to the display panel, toward an observation side of the display panel. Thus, the display apparatus can perform wide viewing angle display and narrow viewing angle display with sufficiently high luminance and contrast of the display image.

In the display apparatus of the present invention, it is preferable that the viewing angle restricting element is arranged on the observation side of the display panel, and formed of a member that transmits image light irradiated from the display panel. Preferably, the viewing angle restricting element comprises a light irradiating device that irradiates restricting light including light intensity peaks in at least two directions inclined in one direction and a direction opposite thereto at predetermined angles with respect to a direction of normal to the display panel, toward the observation side. In this case, desirably, the light irradiating device irradiates light with directivity including light intensity peaks in directions inclined toward one side in a horizontal direction seen from the observation side of the display apparatus and toward the other side opposite to it at predetermined angles with respect to the direction of normal to the display apparatus.

In the display apparatus of the present invention, preferably, the display panel includes a range of viewing angle where a display image is visually recognizable, within an angular range that includes an exit direction of the light with directivity irradiated from the viewing angle restricting element and is wider than a range of spread angle of the light irradiated from the viewing angle restricting element. Alternatively, preferably, the display panel includes a predetermined range of viewing angle where a display image is visually recognizable, and the viewing angle restricting element irradiates light within a restricting angular range in the range of viewing angle that includes the predetermined restricting direction and is narrower than the range of viewing angle.

The display apparatus according to the present invention preferably further comprises a surface illuminant that is arranged on a side opposite to the observation side of the display panel and irradiates the display panel with illumination light. In this case, desirably, the surface illuminant irradiates the display panel with the illumination light that spreads in a predetermined angular range including a direction of the light with directivity irradiated from the viewing angle restricting element, the direction being inclined with respect to the direction of normal to the display panel. Desirably, the surface illuminant comprises a light guide plate that is formed of a flat plate-like transparent member, guides light entering thereto through at least one end face thereof, and irradiates the light through one plate surface thereof, and at least one light-emitting element that is arranged to oppose at least one end face and cases light to enter the light guide plate through the end face.

Furthermore, in the display apparatus of the present invention, preferably, the viewing angle restricting element comprises a light guide member that is formed of a plate-like transparent member including two opposing plate surfaces and end faces intersecting the plate surfaces, and irradiates light, entering the transparent member through at least one end face thereof, from one of the two plate surfaces of the transparent member in two directions inclined toward one side and a side opposite to it at predetermined angles with respect to a normal to the plate surface, and a light source unit that is arranged on the end face of the light guide member and causes light to enter the light guide member through the end face thereof.

Preferably, the viewing angle restricting element comprises a light guide member that is formed of a transparent plate including two opposing plate surfaces, two end faces intersecting the two plate surfaces, and two other opposing side end faces respectively intersecting the two plate surfaces and the two end faces, and includes an incident end face, on at least one of the two end faces, to receive light, an exit surface, on one of the two plate surfaces, to irradiate light, and a reflection surface, on the other plate surface, to internally reflect light entering through the incident end face in directions inclined toward one side end face and the other side end face with respect to a normal to the incident end face, toward the exit surface in directions inclined in one direction and the other direction with respect to a plane including the normal to the incident end face and a normal to the exit surface, the reflection surface opposing a surface of the display panel on the observation side, and a light source unit that is arranged to oppose the incident end face of the light guide member and irradiates light in directions inclined toward one side end face and the other side end face of the light guide member with respect to the normal to the incident end face of the light guide member, toward the incident end face of the light guide surface. In this case, desirably, the light source unit comprises a light-emitting member that is arranged to oppose the incident end face of the light guide member and emits light toward the incident end face of the light guide member, and a prism array that is arranged between the incident end face of the light guide member and the light-emitting member, and refracts the light from the light-emitting member in directions inclined toward one side end face and the other side end face of the light guide member with respect to the normal to the incident end face of the light guide member, to enter the light guide member through the incident end face.

In the display apparatus of the present invention, preferably, the display panel comprises a liquid crystal display panel including a screen region where pixels that control transmission of light are arranged in a matrix, and a surface illuminant that is arranged on a side opposite to the observation side of the liquid crystal display panel and radiates illumination light spreading in an angular range that includes an exit direction of the light with directivity irradiated from the viewing angle restricting element and is wider than a range of spread angle of the light irradiated from the viewing angle restricting element, toward the liquid crystal display panel.

The display apparatus of the present invention may comprise a display panel that displays an image within a predetermined range of viewing angle where an image is visually recognizable, and a viewing angle restricting element that is arranged on an observation side of the display panel, transmits image light irradiated from the display panel, and selectively irradiates, toward the observation side, restricting light with directivity having a light intensity peak in a restricting direction that is within the range of viewing angle and inclined at a predetermined angle with respect to a direction of normal to the display panel. In this case, preferably, the display apparatus further comprises a surface illuminant that is arranged on a side opposite to the observation side of the display panel and irradiates the display panel with illumination light that spreads in a range of viewing angle where the image is visually recognizable.

In the display apparatus of the present invention, preferably, the viewing angle restricting element irradiates the restricting light in a restricting angular range that includes a restricting direction inclined at a predetermined angle with respect to the direction of normal to the display panel and is narrower than the range of viewing angle. Preferably, the viewing angle restricting element comprises a light guide member that is formed of a plate-like transparent member including two opposing plate surfaces and end faces intersecting the plate surfaces, and irradiates light entering the transparent member through at least one end face thereof, from one of the two plate surfaces of the transparent member in two directions inclined toward one side and a side opposite to it at predetermined angles with respect to a normal to the plate surface, and a light source unit that is arranged on the end face of the light guide member and causes light to enter the light guide member through the end face thereof. In this case, desirably, the light source unit comprises a light-emitting element array that is arranged to oppose the incident end face of the light guide member and includes light-emitting elements arrayed that emit light toward the incident end face of the light guide member, and a prism array that includes isosceles triangular prism portions arrayed, is arranged between the-incident end face of the light guide member and the light-emitting element array, and refracts the light from the light-emitting element array in directions inclined toward one side end face and the other side end face of the light guide member with respect to the normal to the incident end face of the light guide member, to enter the light guide member through the incident end face.

Furthermore, the display apparatus of the present invention may comprise a liquid crystal display panel that includes a screen region where pixels that control transmission of light are arranged in a matrix, and displays an image formed of the pixels within a visually recognizable predetermined range of viewing angle, a viewing angle restricting element that comprises a light guide member and a light source unit, the light guide member being arranged on an observation side of the liquid crystal display panel, formed of a plate-like transparent member including two opposing plate surfaces and end faces intersecting the plate surfaces, transmitting image light irradiated from the display panel, and irradiating light entering the transparent member through at least one end face thereof, through one of the two plate surfaces of the transparent member in two directions inclined toward one side and a side opposite thereto at predetermined angles with respect to a direction of normal to the plate surface within the range of viewing angle, and the light source unit being arranged at the end face of the light guide member and causing the light to enter the light guide member through the end face, and a surface illuminant that is arranged on a side opposite to the observation side of the liquid crystal display panel and irradiates the liquid crystal display panel with illumination light that spreads within the range of viewing angle.

In this case, preferably, the viewing angle restricting element comprises a light guide member that is formed of a transparent plate including two opposing plate surfaces, two end faces intersecting the two plate surfaces, and two other opposing side end faces intersecting the two plate surfaces and the two end faces, and includes an incident end face, on at least one of the two end faces, to receive light, an exit surface, on one of the two plate surfaces, to irradiate light, and a reflection surface, on the other plate surface that includes inclined reflecting portions to internally reflect light entering through the incident end face in directions inclined toward one side end face and the other side end face with respect to a normal to the incident end face, toward the exit surface in directions inclined in one direction and the other direction with respect to a plane including the normal to the incident end face and a normal to the exit surface, the reflection surface opposing a surface of the display panel on the observation side, and a light source unit that is arranged to oppose the incident end face of the light guide member and irradiates light in directions inclined toward one side end face and the other side end face of the light guide member with respect to the normal to the incident end face of the light guide member, toward the incident end face of the light guide surface to reach the reflecting portions of the light guide member.

According to the above embodiment, the light source unit 25 of the viewing angle restricting element 19 comprises the light-emitting member 26 and prism array 27. The light source unit 25 may have another arrangement as far as it irradiates, toward the incident end face 21 of the light guide member 20, light in directions inclined toward one side edge and the other side edge of the light guide member 20 with respect to the axial direction Y that is parallel to the exit surface 22 of the light guide member 20 and perpendicular to the incident end face 21.

The display apparatus of the above embodiment comprises the liquid crystal display panel 1. Alternatively, the display panel that displays an image may be a light emission type display panel such as an EL (electroluminescence) display panel. Use of the light emission type display panel allows omission of the surface illuminant 8 to further reduce the cost.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display apparatus comprising:
   a display panel that displays an image;
   a viewing angle restricting element that selectively irradiates light with directivity in a restricting direction at a predetermined angle with respect to a direction normal to the display panel, toward an observation side of the display panel; and
   a surface illuminant that is arranged on a side opposite to the observation side of the display panel and irradiates the display panel with illumination light.

2. The apparatus according to claim 1, wherein the viewing angle restricting element is arranged on the observation side of the display panel and comprises a member that transmits image light irradiated from the display panel.

3. The apparatus according to claim 1, wherein the viewing angle restricting element comprises a light irradiating device that irradiates restricting light having light intensity peaks in at least two directions inclined toward one direction and a direction opposite thereto at predetermined angles with respect to the direction normal to the display panel, toward the observation side.

4. The apparatus according to claim 3, wherein the light irradiating device irradiates the light with directivity having the light intensity peaks in directions inclined toward one side in a horizontal direction seen from the observation side of the display apparatus and toward the other side opposite thereto at predetermined angles with respect to the direction normal to the display apparatus.

5. The apparatus according to claim 1, wherein the display panel has a viewing angle range in which a display image is visually recognizable, wherein the viewing angle range is an angular range that includes an exit direction of the light with directivity irradiated from the viewing angle restricting element and that is wider than a range of a spread angle of the light irradiated from the viewing angle restricting element.

6. The apparatus according to claim 1, wherein the display panel has a predetermined viewing angle range in which a display image is visually recognizable, and
   wherein the viewing angle restricting element irradiates the light within a restricting angular range in the viewing angle range, the restricting angular range including the restricting direction and being narrower than the viewing angle range.

7. The apparatus according to claim 1, wherein the surface illuminant irradiates the display panel with the illumination light such that the illumination light spreads in a predetermined angular range that includes a direction of the light with directivity irradiated from the viewing angle restricting element, the direction being inclined with respect to the direction normal to the display panel.

8. The apparatus according to claim 1, wherein the surface illuminant comprises:
   a light guide plate that includes a flat plate-like transparent member, guides light entering thereto through at least one end face thereof, and irradiates the light through one plate surface thereof, and
   at least one light-emitting element that is arranged to oppose said at least one end face and causes light to enter the light guide plate through the end face.

9. The apparatus according to claim 1, wherein the viewing angle restricting element comprises:
   a light guide member that includes a plate-like transparent member including two opposing plate surfaces and end faces intersecting the plate surfaces, and that irradiates light entering the transparent member through at least one end face thereof from one of the two plate surfaces of the transparent member in two directions inclined toward one side and a side opposite thereto at predetermined angles with respect to a normal to the plate surface, and
   a light source unit that is arranged to oppose the end face of the light guide member and causes light to enter the light guide member through the end face thereof.

10. The apparatus according to claim 1, wherein the viewing angle restricting element comprises:
    a light guide member that is formed of a transparent plate including two opposing plate surfaces, two end faces intersecting the two plate surfaces, and two other opposing side end faces respectively intersecting the two plate surfaces and the two end faces, wherein the light guide member includes (i) an incident end face at least at one of the two end faces, to receive light, (ii) an exit surface at one of the two plate surfaces, to irradiate light, and (iii) a reflection surface at the other plate surface, to internally reflect light entering through the incident end face in directions inclined toward one side end face and the other side end face with respect to a normal to the incident end face, toward the exit surface in directions inclined toward one direction and another direction opposite thereto with respect to a plane including the normal to the incident end face and a normal to the exit surface, the reflection surface opposing a surface of the display panel on the observation side; and
    a light source unit that is arranged to oppose the incident end face of the light guide member and irradiates light in the directions inclined toward the one side end face and the other side end face of the light guide member with respect to the normal to the incident end face of the light guide member, toward the incident end face of the light guide surface.

11. The apparatus according to claim 10, wherein the light source unit comprises:
    a light-emitting member that is arranged to oppose the incident end face of the light guide member and emits light toward the incident end face of the light guide member, and a prism array that is arranged between the incident end face of the light guide member and the light-emitting member, and refracts the light from the light-emitting member in the directions inclined toward the one side end face and the other side end face of the light guide member with respect to the normal to the incident end face of the light guide member.

12. A display apparatus comprising:
a liquid crystal display panel that includes a screen region where pixels that control transmission of light are arranged in a matrix, and displays an image;
a viewing angle restricting element that selectively irradiates light with directivity in a restricting direction at a predetermined angle with respect to a direction normal to the display panel, toward an observation side of the display panel; and
a surface illuminant that is arranged on a side opposite to the observation side of the liquid crystal display panel and radiates illumination light spreading in an angular range that includes an exit direction of the light with directivity irradiated from the viewing angle restricting element and is wider than a range of a spread angle of the light irradiated from the viewing angle restricting element, toward the liquid crystal display panel.

13. A display apparatus comprising:
a display panel that displays an image within a predetermined viewing angle range in which an image is visually recognizable;
a viewing angle restricting element that is arranged on an observation side of the display panel, transmits image light irradiated from the display panel, and selectively irradiates, toward the observation side, restricting light with directivity having a light intensity peak in a restricting direction that is within the viewing angle range and inclined at a predetermined angle with respect to a direction normal to the display panel; and
a surface illuminant that is arranged on a side opposite to the observation side of the display panel and irradiates the display panel with illumination light that spreads in the viewing angle range.

14. The apparatus according to claim 13, wherein the viewing angle restricting element irradiates the restricting light in a restricting angular range that includes the restricting direction and is narrower than the viewing angle range.

15. The apparatus according to claim 13, wherein the viewing angle restricting element comprises:
a light guide member that includes a plate-like transparent member including two opposing plate surfaces and end faces intersecting the plate surfaces, and that irradiates light entering the transparent member through at least one incident end face thereof from one of the two plate surfaces of the transparent member in two directions inclined toward one side and a side opposite thereto at predetermined angles with respect to a normal to the plate surface, and
a light source unit that is arranged to oppose the end face of the light guide member and causes light to enter the light guide member through the incident end face.

16. The apparatus according to claim 15, wherein the light source unit comprises:
a light-emitting element array that is arranged to oppose the incident end face of the light guide member and includes light-emitting elements that emit light toward the incident end face of the light guide member, and
a prism array that includes isosceles triangular prism portions, arranged between the incident end face of the light guide member and the light-emitting element array, and refracts the light from the light-emitting element array in directions inclined with respect to a normal to the incident end face toward a first side end face of the light guide member and a second side end face opposite to the first side end face.

17. A display apparatus comprising:
a liquid crystal display panel that includes a screen region where pixels that control transmission of light are arranged in a matrix, and displays an image formed of the pixels within a visually recognizable predetermined viewing angle range;
a viewing angle restricting element that comprises a light guide member and a light source unit, the light guide member being arranged on an observation side of the liquid crystal display panel and including a transparent plate including two opposing plate surfaces and end faces intersecting the plate surfaces, wherein the viewing angle restricting element transmits image light irradiated from the liquid crystal display panel, and wherein the viewing angle restricting element irradiates light entering the transparent plate through at least one incident end face thereof, through one of the two plate surfaces of the transparent plate in two directions that are within the viewing angle range and are inclined toward one side of the liquid crystal display panel and another side opposite thereto at predetermined angles with respect to a direction normal to the plate surface, and wherein the light source unit is arranged at the incident end face of the light guide member and causes the light to enter the light guide member through the incident end face; and
a surface illuminant that is arranged on a side opposite to the observation side of the liquid crystal display panel and irradiates the liquid crystal display panel with illumination light that spreads within the viewing angle range.

18. The apparatus according to claim 17, wherein the transparent plate of the light guide member includes the two opposing plate surfaces, two end faces intersecting the two plate surfaces, and two other opposing side end faces intersecting the two plate surfaces and the two end faces,
wherein the light guide member includes (i) the at least one incident end face at least at one of the two end faces of the transparent plate, (ii) an exit surface at said one of the two plate surfaces of the transparent plate, to irradiate light, and (iii) a reflection surface, on the other plate surface of the transparent plate,
wherein the reflection surface includes inclined reflecting portions to internally reflect light entering through the incident end face in directions inclined toward one side end face and the other side end face with respect to a normal to the incident end face, toward the exit surface in the two directions, which are inclined toward one direction and another direction opposite thereto with respect to a plane including the normal to the incident end face and the normal to the plate surface at which the exit surface is provided, the reflection surface opposing a surface of the liquid crystal display panel on the observation side, and
wherein the light source unit is arranged to oppose the incident end face of the light guide member and irradiates light in the directions inclined toward the one side end face and the other side end face of the light guide member with respect to the normal to the incident end face of the light guide member, toward the incident end face of the light guide surface to reach the reflecting portions of the light guide member.

* * * * *